Feb. 26, 1924.
R. B. WASSON
1,484,691
APPARATUS AND PROCESS FOR REGISTERING AND ASSEMBLING PACKING RINGS
Filed Aug. 13, 1921     6 Sheets-Sheet 1
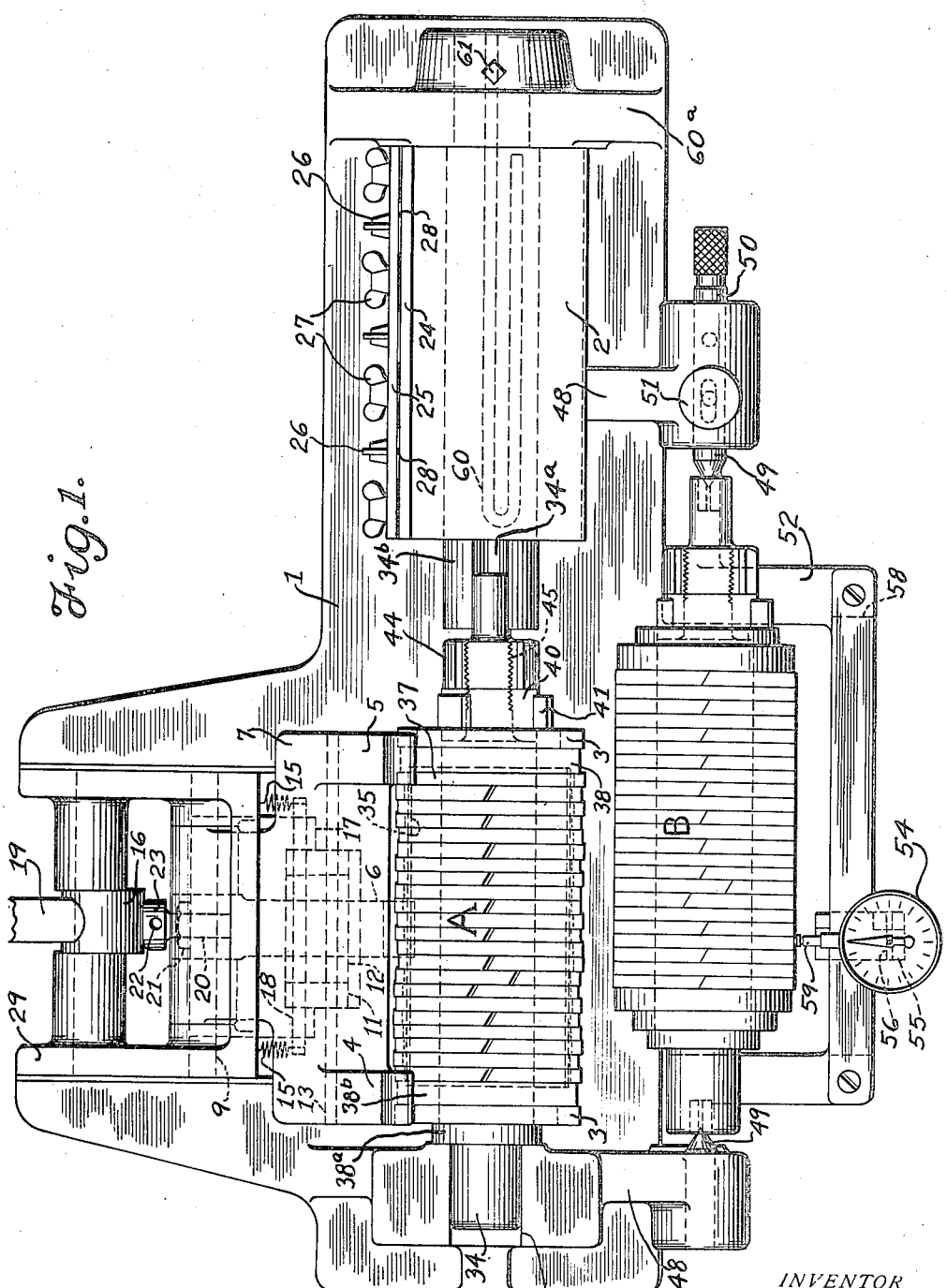

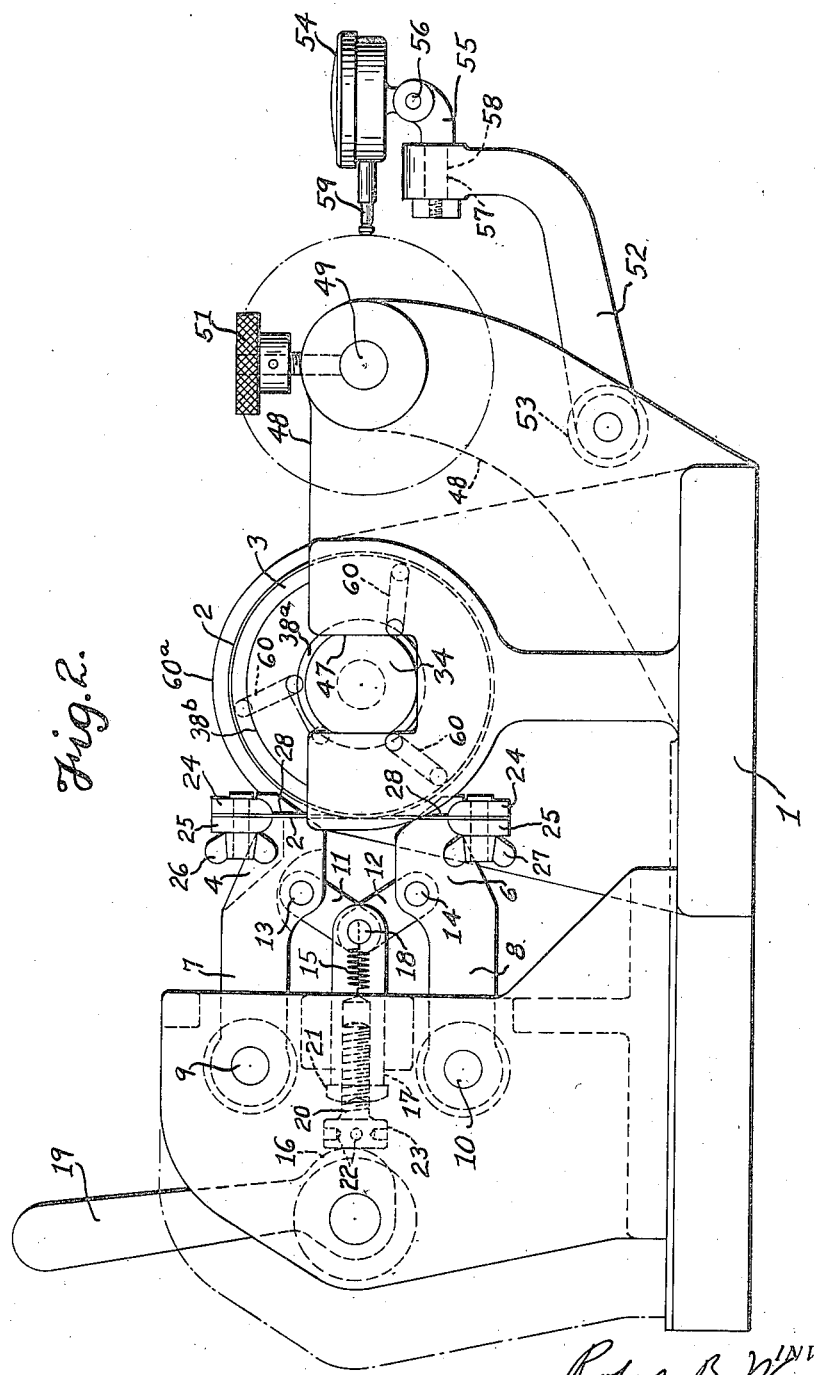

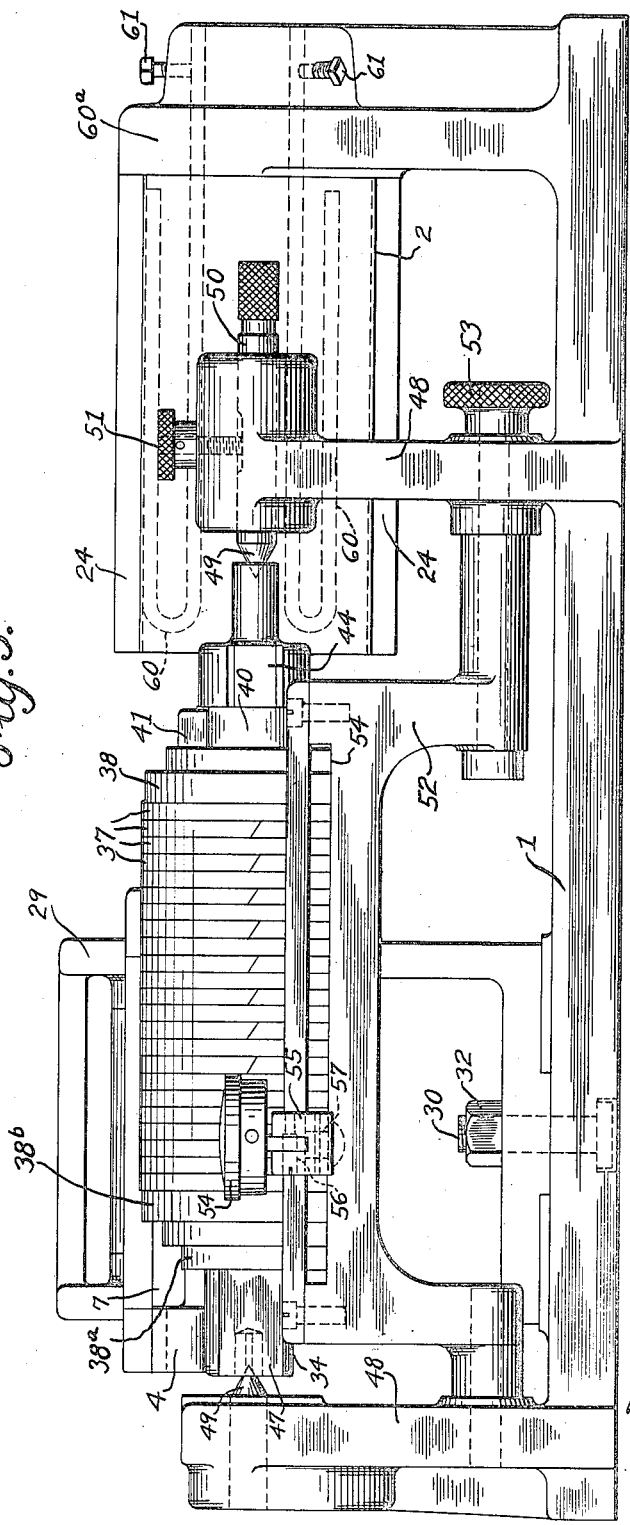

Feb. 26, 1924.
R. B. WASSON
1,484,691
APPARATUS AND PROCESS FOR REGISTERING AND ASSEMBLING PACKING RINGS
Filed Aug. 13, 1921   6 Sheets-Sheet 4
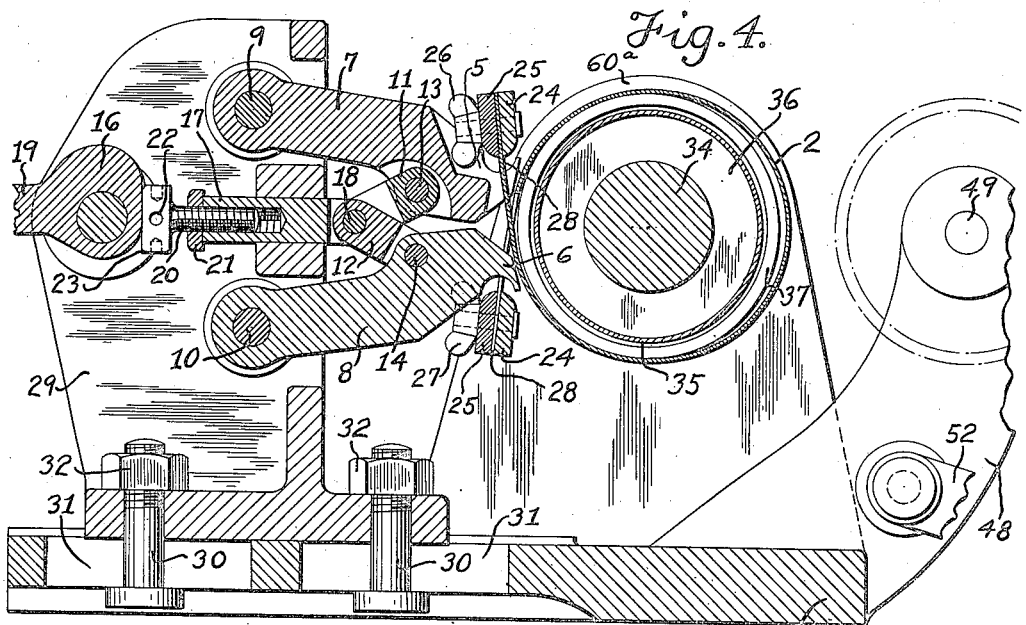
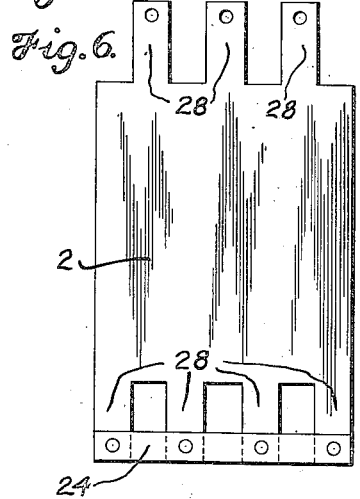
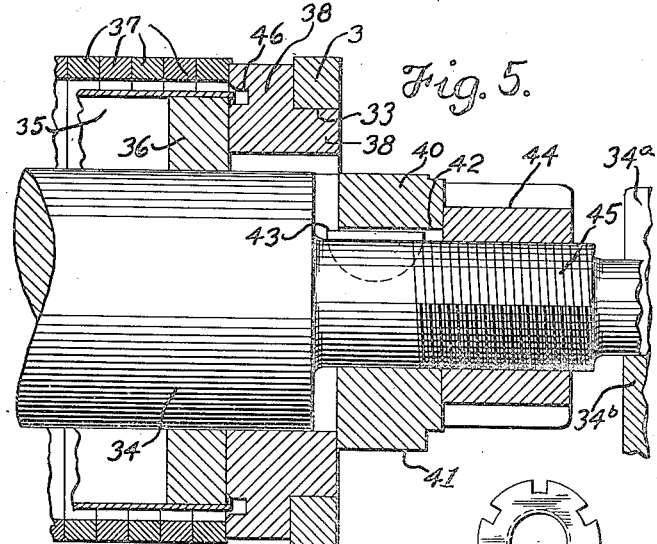
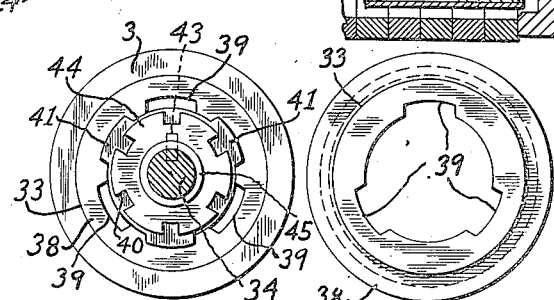
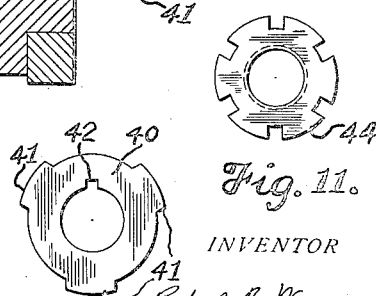
INVENTOR
Robert B. Wasson
by W. J. Bissing
ATTORNEY

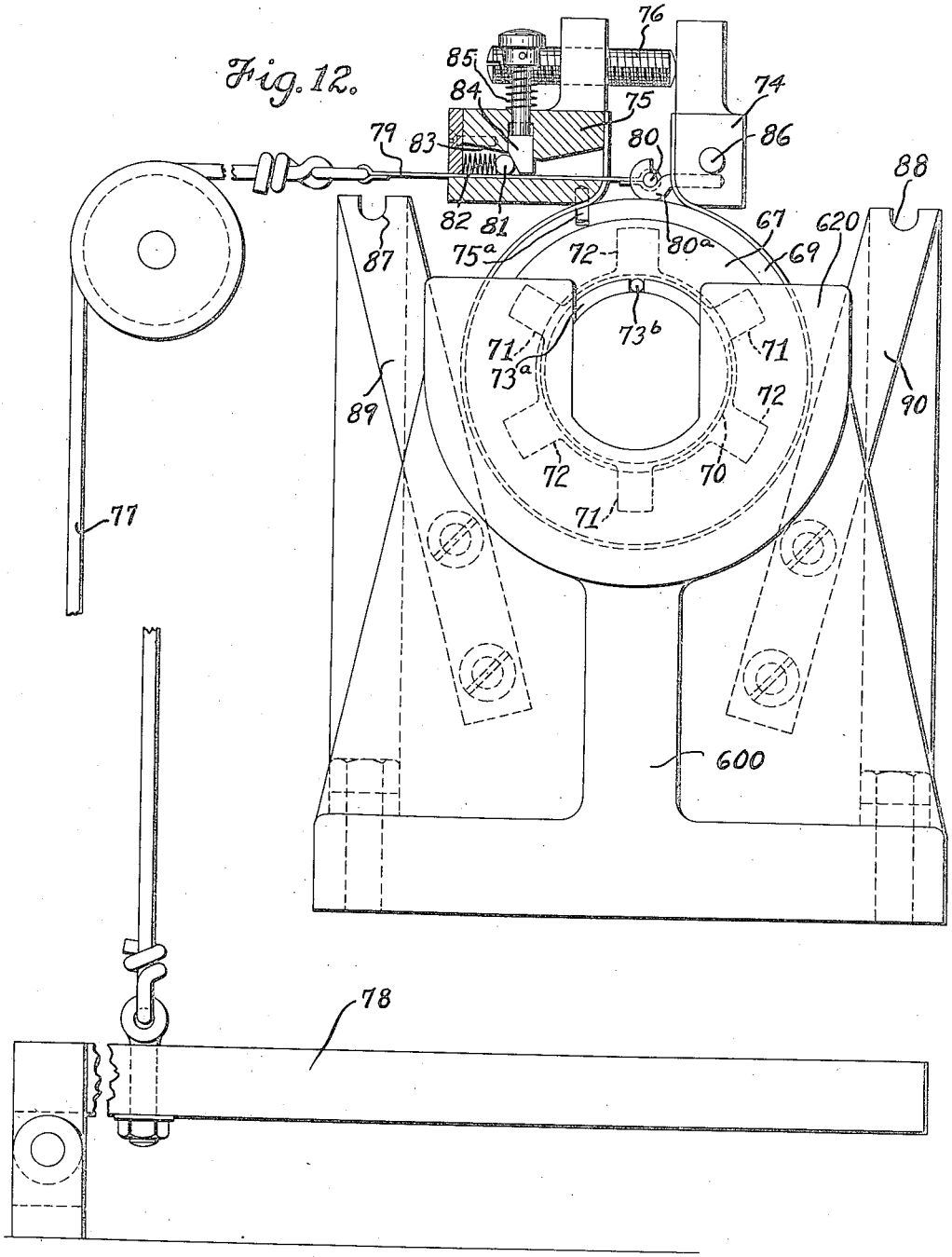

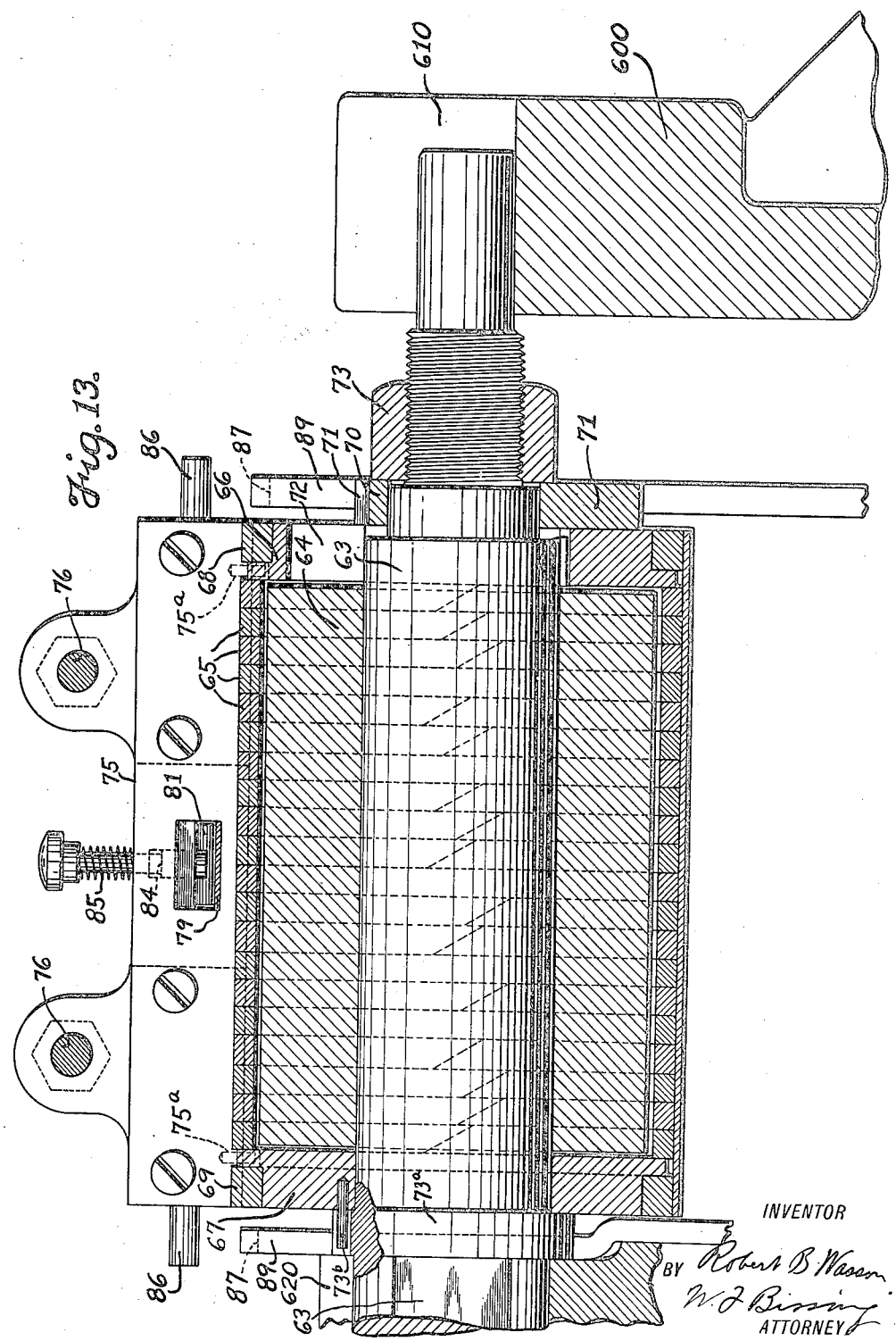

Patented Feb. 26, 1924.

1,484,691

UNITED STATES PATENT OFFICE.

ROBERT B. WASSON, OF CRANFORD, NEW JERSEY.

APPARATUS AND PROCESS FOR REGISTERING AND ASSEMBLING PACKING RINGS.

Application filed August 13, 1921. Serial No. 492,012.

*To all whom it may concern:*

Be it known that I, ROBERT BINGHAM WASSON, a citizen of the United States, residing at 306 Elizabeth Avenue, Cranford, New Jersey, have invented new and useful Improvements in Apparatus and Processes for Registering and Assembling Packing Rings, of which the following is a specification.

My invention relates to an apparatus and process for registering and assembling packing rings and particularly to an apparatus and process for micrometrically registering and assembling and gaging packing rings for grinding, turning or otherwise finishing their outside diameters.

One of the objects of my invention is to provide a ready, quick and efficient method and means of assembling piston rings to be ground, turned or finished, reducing the labor and equipment cost, cheapening the construction and improving the quality of the product.

Another object of the invention is to provide a method and device by which the rings may be assembled so that their circumferential faces are brought to substantially circular and concentric positions before presenting them to the finishing machine.

Another object of the invention is to provide a machine and method for assembling piston rings adapted to work on different sizes of rings with inexpensive changes and adjustments.

Another object of the invention is to provide a machine and method in which a flexible band of metal is utilized, the ends of the band being provided with rigid parallel bars, one for each end, thereby avoiding buckling of the ends of the band, the band being adapted to be forcibly curved about a pair of concentric sizing collars, thus producing a true cylindrical form for compressing the rings and registering the circumferential faces of the rings with the cylindrical form.

Another object of the invention is to provide a machine and process in which the faces of the ring assume their true normal form without being influenced by friction of the confining member.

In accordance with my invention I provide means whereby split piston rings which have been treated or shaped so as to give substantially uniform radial outward pressure and whose outside circumferential faces are substantially circular when the rings are compressed to their working diameters, may be confined to their standard diameters plus an allowance for finishing. I confine them in registering relation with a flexible cylindrical form and avoid the deleterious effects of friction between the rings and the flexible form which engages them. I gage them if desired before presenting them to the finishing machine.

With the above and other objects in view my invention consists in the parts, improvements and combinations more fully pointed out hereinafter.

Turning now to the drawings:

Fig. 1 is a top plan view of one form of the apparatus embodying my invention and illustrating the method of bringing the circumferential faces of the rings into registering relation.

Fig. 2 is a side elevation viewed from the left of Fig. 1.

Fig. 3 is a front elevation of the machine shown in Fig. 1, viewing the machine from the side carrying the gage.

Fig. 4 is a vertical transverse section of the parts shown in Fig. 1.

Fig. 5 illustrates a section of a detail of one end of the means for clamping the rings upon a work-holding arbor.

Fig. 6 is a view of the band on a reduced scale.

Fig. 7 is a view on a reduced scale of one of the parallel bars.

Fig. 8 is a view on a reduced scale, partly in section, of the clamping means shown in Fig. 5.

Figs. 9, 10 and 11 illustrate detail views of parts of the clamping mechanism.

Figs. 12 and 13 illustrate respectively a side elevation partly in section and a vertical longitudinal section of another form of the invention.

In the drawings, mounted upon the frame 1 of the machine, I provide a simple, accurate and efficient flexible means for forming a hollow cylinder, whose interior is of a predetermined size adapted to engage and compress the piston rings.

In accordance with my invention I provide a band 2 of flexible sheet metal and a plurality of concentric sizing collars 3, preferably one for each side of the band. The band is preliminarily curved to form a loop.

Means are provided for flexing the band around the sizing collars, thereby curving the interior of the band into substantially cylindrical form of predetermined size. These means may be varied. In the embodiment of the invention illustrated in Fig. 1 I provide jaws for the purpose, one jaw for each end of the band, adapted to draw the band about the rings. Each jaw may be provided with one or more gripping members, the upper jaw preferably carrying two gripping members 4, 5 and a lower jaw carrying gripping members 6. An even tension is thereby transmitted to the band. These gripping members may be arranged in the form of hooks adapted to enter the slots in the ends of the band and to engage the parallel bars attached to the band.

Means are provided, which may be varied, for opening and closing the jaws. In the embodiment of the invention illustrated in Fig. 1 the jaws are carried upon arms 7 and 8 which are movably mounted with relation to the carriage in which they are located. In the particular embodiment of the invention illustrated, the arms 7 and 8 are pivoted in a carriage as by means of pivots 9 and 10.

The jaws are connected together, in the form illustrated, by a link motion forming a kind of toggle consisting of a pair of links 11 and 12, the link 11 being pivoted at 13 in the jaw 7 and the link 12 being pivoted at 14 in the jaw 8. Means are provided for making and breaking the toggle, thus moving the jaws. These means may be varied, but in the form illustrated in Fig. 1 the toggle is broken by means of springs 15 attached to the toggle at one end and to the carriage at the other. The toggle is made, in the form illustrated, thus bringing the jaws into action to flex the band about the sizing collar by means of a cam 16 and slide 17. The slide 17 which is mounted in guides, is connected to the toggle at the pivot point 18. The cam may be actuated by a lever and handle 19. An adjusting mechanism is preferably provided for varying the throw of the jaws. In the form illustrated this consists of a screw 20 screwing into the slide 17 and locked in place by nut 21, the screw being adjustable by reason of holes 22 in its head 23, so that the screw may be turned. The head 23 engages the face of the cam 16.

Means are provided for preventing the buckling of the ends of the band. These means may be varied. In the form illustrated each end of the band carries a barlike member, thus forming two parallels, one for each end of the band. These members may consist of two strips 24, 25 tightly clamped to the ends by wing nuts 26, 27. These strips are preferably secured to tongues 28 forming part of the ends of the bands. The band is carefully cut with parallel rectilinear sides and the barlike members are secured to the end of the band in such a way that the gripping edges of the strips are parallel to each other. This permits the band to be accurately curved about the sizing collars into substantially cylindrical form. The band is flexed into a loop form and the tongues of one end passed thru the corresponding slots of the other and the strips for both ends are then firmly clamped to the tongues, so that the clamping, grippping edges of the strips are substantially parallel. The strips are curved at their inner sides, thus fitting into the curved pockets of the gripping members.

Means are provided permitting a bodily separation between the jaw carrying member and the device which holds the piston rings in clamped relation. Either member may be made movable. In the form illustrated I mount the jaws upon a sliding carriage 29 which may be pulled away from the ring clamp by the handle 19. The carriage is guided by means of bolts 30 passing thru guide slots 31, the bolts being secured to the carriage by nuts 32.

Means are provided for assembling the sizing collars in concentric relation to each other and the arbor. These means may be varied. In the form of the invention illustrated the arbor 34 has its surface accurately ground to a true cylinder. The sizing collars whose peripheries are accurately ground to circular form are supported by the arbor in concentric relation to each other and the arbor. In the form illustrated they are mounted upon keepers for the rings which keepers in turn are concentrically carried by the arbor. The keepers are ground to true concentric cylindrical form inside and out, the bore fitting the face of the arbor.

Means are provided for readily removing the sizing collars. These means may be varied. In the form illustrated the keepers form a part of the clamping mechanism and each is provided with a collar seat 33 into which the collar may be readily inserted and from which it may be quickly removed.

By thus removing the sizing collar, the circumferential faces of the rings may be presented to the grinder without grinding the collars or the keepers which clamp the rings.

Means are provided for assembling the rings to be ground and clamping them upon a work holder. These means may be varied. In the form illustrated the work holder consists of the work arbor 34. A spacing bushing 35 with heads 36 is carried by the work arbor, thus providing a quick and approximate spacer for the rings 37, preventing the rings becoming unduly eccentric to the center lines of the arbor.

Means are provided which may be varied, for clamping the rings to the arbor, without subjecting them to torsional or twisting action. In the form illustrated I make use at one end of the arbor, of a keeper 38 whose inner face contacts with the side of the end ring when the rings are clamped together. At the other end the arbor carries an integral rim 38$^a$ and a loose keeper 38$^b$. The keeper 38 is provided with a plurality of grooves 39. Means, which may be varied, are provided for pressing the keeper against the end ring. In the form illustrated I make use of a sliding spider 40 having wings 41 and guided so as to slide upon the shaft by keyway 42 adapted to engage the key 43, preventing rotation of the spider and avoiding rotation of the keeper. A nut 44 engaging the screw threaded portion 45 of the arbor will when turned drive the spider 40 pressing it against the keeper and the keeper against the rings, without twisting the rings. I preferably provide only one end of the shaft with the driving mechanism.

To loosen or unclamp the rings the nut 44 is loosened. To remove the rings the keeper is slightly turned so that its grooves 39 match the wings 41 on the spider. The keeper can then be removed and with it the sizing collar 3. A new set of rings may then be placed upon the arbor. The keeper 38 may be grooved at 46 to receive the end of the filler cylinder 35. One end of the arbor 34 is preferably made round to fit in a recess 34$^a$ located in the centering supporting post 34$^b$. The post is carried by the upright 60 at one end. The other end of the arbor is squared off at 47 to prevent rotation of the arbor, when the clamping nut is forced home.

Means are provided for gaging the rings and thus determining whether their outside circumferential faces are substantially cylindrical.

I provide work supporting standards for this purpose and a gage so that after the ring holding arbor is placed on the centers in the standards, the gage may be moved across the faces of the rings, parallel to the line of centers, while they are rotated thereon.

I provide a pair of standards 48 in which centers 49 are carried. One of these centers may be arranged to slide in and out, being carried by a sliding bolt 50 and secured in place by thumb screw 51 engaging a recess in the bolt. The work supporting arbor 34 carrying the rings, is mounted between the bearings, and may be rotated while gaging.

The measuring gage is preferably mounted on a swinging frame 52 which may be tightened in place by finger wheel 53, gage 54 being carried by a bracket 55 to which it may be pivotally secured at 56, the bracket carrying a guiding stem 57 passing thru the slot 58 in the transverse bar of the frame. In this way the staff 59 of the gage may be passed transversely across the faces of the rings, maintaining parallelism with the line of centers, thus determining which of them have their faces non-circular, and to what degree.

Means are provided for supporting the flexible band in its loosened condition after the flexible band has brought the rings into substantially cylindrical relation, and when it is desired to remove the arbor carrying the ring and to present them to the finishing machine and to supply another arbor carrying the rings to the apparatus. These means may be varied. In the form illustrated, after breaking the toggle, the ends of the bands being now free, the band is carried to one side and is supported by adjustable brackets 60. These brackets preferably consist of bent rods 60 of metal, one end of which is secured into an upright 60$^n$ as by means of a set screw 61, the other end being bent. In this way the brackets can be adjusted into the position shown in Fig. 2 so as to form a holder in line with the clamping means with the ends arranged in a circle. The flexible band with the attached bars may thus be carried over onto the brackets after the jaws have been contracted and freed from the bars.

Having thus described the invention, its operation is as follows:

The arbor carrying one of its keepers and the spacing bushing is set up on end for loading. A set of rings is then slipped over the spacing bushing and lightly clamped in place by first placing the second keeper in position against the end ring. This is accomplished as follows. The keeper with its grooves is slipped over the wings of the spider and the keeper given a partial turn so as to throw the wings out of relation with the grooves. The nut is then lightly screwed up on the shaft, thus forcing the spider home against the keeper and the keeper home against the ring. The sizing collar may now be slipped into the seat on the keeper. The arbor with its rings is now placed in the arbor supports. The rings now have the position shown at A in Fig. 1.

The band is moved from its carrying brackets at the right of the machine in Fig. 1 into its correct relation with the clamping jaws at the left of the machine, the parts being in the position illustrated in Fig. 4, the band now surrounding the rings.

The toggle is now made and the flexible band forcibly curved about the sizing collars, overcoming the inherent tension of the rings, the clamping mechanism for the rings including the nut 44 being slightly loose so as to leave the rings free to take their normal position within the band, in registering engagement therewith. The clamping mechanism is then tightened. But before tightening, the arbor and the rings carried thereby may be tapped to vibrate the rings so as to allow the rings to reach their normal positions within the band without being under the influence of the disturbing effect of friction between the band and the rings. The toggle is then broken and the band with its parallels slipped to the right over and upon the brackets. The work arbor with the rings can now be lifted vertically out of the machine and the rings may be gaged. The rings have the position shown at B, Fig. 1. These operations may be repeated to secure the best results. The work arbor with the rings may now be taken to the finishing machine, as for example to the grinder, and are re-gaged. While one set of rings is being ground, another set is being put thru the same process.

Referring now to the form of the invention illustrated in Figs. 12 and 13 which illustrates a form in which fewer parts are used, the machine with its frame 600 carries bearings 610 and 620, the latter being squared so as to receive the squared end of the work arbor 63. A filler block 64 is carried by the work arbor for approximately spacing the rings 65 with reference to the line of centers of the arbor. The rings are clamped to the work arbor by means of keepers 66 and 67, each carrying a sizing collar 68 and 69 seated in a groove in the keeper. A spider 70 is mounted upon one end of the shaft and its arms 71 may be made to register with grooves 72 in the keeper 66. A nut 73 screwed upon the arbor forces the spider against the keeper and the keeper against the rings. On the other end of the arbor there is an integral rim 73$^a$ against which the keeper 67 abuts. By loosening the nut and by turning the spider so that its arms will register with the grooves in the keeper, the keeper 66 may be slipped off and the rings removed. The entire lot of rings may be presented to the grinding machine by removing the sizing collars after opening the band.

The flexible band is wrapped around the sizing collars by means of a pair of parallels 74 and 75 one secured to each end of the band. Stops 76 limit the approach of the parallels. A cable 77, foot pedal 78, the cable being attached to a strap 79 and the latter carrying a pin 80 which engages the hook 80$^a$ attached to the parallel 74, permits the operator to close the jaws of the metal band. To prevent rotation, the parallel 75 is locked to the keeper 67 by pins 75$^a$ and the keeper 67 is locked to the rim and arbor by bolt 73$^b$. A roller clutch consisting of a roller 81 pressed by spring 82 and contacting with the wedge 83 serves to lock the jaws closed. A spring-pressed plunger 84 when depressed against the force of the spring 85 releases the roller and opens the clutch. After the clutch is opened, the strip 79 may be unhooked from the hook 80$^a$. The two jaws 74 and 75 may then be laid open and the pins 86 laid into sockets 87, 88 mounted in standards 89, 90, thus holding the band open. The work arbor with its rings may now be lifted out of the machine and presented to the grinder or finishing machine.

Having thus described my invention, it will be clear that it provides a machine and process for assembling and registering packing rings and particularly for bringing their circumferential faces into substantially circular and concentric positions before presenting them to the finishing machine and gaging the circularity of their outside circumferences. It will also be observed that many changes may be made in the construction of the parts without departing from the principle of the invention.

What I claim and desire to secure by Letters Patent is:

1. In an apparatus for registering piston rings to be finished, the combination of a band of flexible metal, one or more sizing rings with which said band is adapted to engage and means for flexing said band around said sizing rings, thereby curving the interior of the band into hollow cylindrical form of standard size, adapted to engage the piston rings.

2. In an apparatus for registering piston rings to be finished, the combination of a band of flexible metal, one or more sizing rings with which said band is adapted to engage and means for flexing said band around said sizing rings, thereby curving the interior of the band into hollow cylindrical form of standard size, adapted to receive the piston rings, said flexing means including means carried by the ends of the band for preventing buckling of the ends.

3. In an apparatus for registering piston rings to be finished, the combination of a band of flexible metal, one or more sizing rings with which said band is adapted to engage and means for flexing said band around said sizing rings, thereby curving the interior of the band into hollow cylindrical form of standard size, adapted to receive the piston rings, said flexing means including bars carried by the ends of the band for preventing buckling of the ends.

4. In an apparatus for registering piston rings to be finished, the combination of a band of flexible metal, one or more sizing rings with which said band is adapted to engage and means for flexing said band around said sizing rings, thereby curving the interior of the band into hollow cylindrical form of standard size, adapted to receive the piston rings, said flexing means including parallel bars, one secured to each end of the band for preventing buckling at the ends.

5. In an apparatus for assembling piston rings to be finished, the combination of a band of flexible metal, a pair of jaws one for each end of the band and a pair of sizing rings with which said band is adapted to engage and means for actuating said jaws, thereby flexing said band around said sizing rings so as to form a hollow cylinder.

6. In an apparatus for assembling piston rings to be finished, the combination of a band of flexible metal, a pair of jaws, one for each end of the band and a pair of sizing rings with which said band is adapted to engage and a toggle for moving said jaws, thereby flexing said band around said sizing rings so as to form a hollow cylinder.

7. In an apparatus for assembling piston rings to be finished, the combination of a band of flexible metal, a pair of jaws, one for each end of the band and a pair of sizing rings with which said band is adapted to engage and a toggle for moving said jaws, thereby flexing said band around said sizing rings so as to form a hollow cylinder, and a spring for opening said toggle.

8. In an apparatus for assembling piston rings to be finished, the combination of a band of flexible metal, a pair of jaws, one for each end of the band and a pair of sizing rings with which said band is adapted to engage and a toggle for moving said jaws, thereby flexing said band around said sizing rings so as to form a hollow cylinder, a spring for opening said toggle, and a cam for actuating said toggle in one direction.

9. In an apparatus for assembling piston rings to be finished, the combination of a band of flexible metal, a pair of jaws, one for each end of the band and a pair of sizing rings with which said band is adapted to engage and a toggle for moving said jaws, thereby flexing said band around said sizing rings so as to form a hollow cylinder, a spring for opening said toggle, a cam for actuating said toggle in one direction and a lever for operating said cam.

10. In an apparatus for assembling piston rings to be finished, the combination of a band of flexible metal, a pair of jaws, one for each end of the band and a pair of sizing rings with which said band is adapted to engage, a toggle for moving said jaws, thereby forcibly flexing said band around said sizing rings so as to form a hollow cylinder, a spring for opening said toggle, a cam for actuating said toggle in one direction, a lever for operating said cam, and adjusting means between said toggle and said cam.

11. In an apparatus for assembling piston rings to be finished, the combination of a band of flexible metal, a pair of pivoted jaws, one for each end of the band and a pair of sizing rings with which said band is adapted to engage and means actuating said jaws, thereby forcibly flexing said band around said sizing rings so as to form a hollow cylinder.

12. In an apparatus for assembling piston rings to be finished, the combination of an arbor adapted to receive the rings to be ground, a band of flexible metal a pair of jaws one adapted to engage each end of the band, a sliding carriage in which said jaws are mounted, and a pair of sizing collars with which said band is adapted to engage, and means for actuating said jaws, thereby flexing said band around said sizing rings so as to form a hollow cylinder.

13. In an apparatus for assembling piston rings, the combination of an arbor for supporting the rings, means for clamping a plurality of said rings upon said arbor, a band of flexible metal, a pair of sizing collars with which said band is adapted to engage, means for flexing said band around said sizing collars so as to form a hollow cylinder and means for supporting said arbor carrying the piston rings within said cylinder.

14. In an apparatus for assembling piston rings, the combination of an arbor for supporting the rings, means for clamping a plurality of said rings, upon said arbor, a band of flexible metal, a pair of sizing collars with which said band is adapted to engage, means for flexing said band around said sizing collars so as to form a hollow cylinder and means for supporting said arbor carrying the piston rings within said cylinder, and means for bodily separating said jaws and said arbor.

15. In an apparatus for assembling piston rings, the combination of an arbor for supporting the rings, keepers for said rings, a band of flexible metal, a pair of sizing collars with which said band is adapted to engage, means for flexing said band around said sizing collars so as to form a hollow cylinder and means for supporting said arbor carrying the piston rings within said cylinder.

16. In an apparatus for assembling piston rings, the combination of an arbor for supporting the rings, keepers for said rings, a sliding member contacting with said keepers, a nut for moving said sliding member, a band of flexible metal, a pair of sizing collars with which said band is adapted to engage, means for flexing said band around said sizing collars so as to form a hollow cylinder and means for supporting said arbor carrying the piston rings within said cylinder.

17. In an apparatus for assembling piston rings, the combination of an arbor for supporting the rings, means for clamping a plurality of said rings upon said arbor, a filler bushing between the arbor and the rings, a band of flexible metal, a pair of sizing collars with which said band is adapted to engage, means for flexing said band around said sizing collars so as to form a hollow cylinder and means for supporting said arbor carrying the piston rings concentrically within said cylinder.

18. In an apparatus for assembling piston rings to be finished, the combination of a band of flexible metal, a pair of concentric sizing rings with which said band is adapted to engage, an arbor having a cylindrical face, said face being concentric with the sizing rings and means for flexing said band around said sizing rings, thereby curving the interior of the band into hollow, cylindrical form of predetermined size, adapted to engage the piston rings.

19. In an apparatus for assembling piston rings to be finished, the combination of a band of flexible metal, an arbor having a cylindrical face, a pair of keepers carried by said arbor, a pair of removable, concentric sizing collars mounted in seats upon said keepers, the face of the arbor being concentric with the sizing collars, and means for flexing said band around said sizing collars, thereby curving the interior of the band into hollow, cylindrical form of standard size, adapted to engage the piston rings.

20. In an apparatus for assembling piston rings to be finished, the combination of a band of flexible sheet metal, an arbor having a cylindrical face, a pair of keepers carried by said arbor, said keepers comprising disks with concentric openings fitting the face of the arbor and provided with annular ring seats, a pair of removable, concentric sizing collars mounted in seats upon said keeper, the face of the arbor being concentric with the sizing collars, and means for flexing said band around said sizing collars, thereby curving the interior of the band into hollow, cylindrical form of predetermined size, adapted to engage the piston rings.

21. In an apparatus for assembling piston rings to be finished, the combination of a band of flexible metal, a pair of concentric sizing collars with which said band is adapted to engage, an arbor with a cylindrical face, said face being concentric with the sizing collars, means for flexing said band around said sizing collars, thereby curving the interior of the band into hollow, cylindrical form of predetermined size, said band having parallel sides and provided with parallel bars carried by the ends of the band.

22. In an apparatus for assembling piston rings, the combination of a band of flexible metal, a pair of jaws one for each end of the band, to which the band is detachably connected and a pair of sizing collars with which said band is adapted to engage and means for actuating said jaws, thereby flexing said band around said sizing collars so as to form a hollow cylinder.

23. In an apparatus for assembling piston rings, the combination of a band of flexible metal, a pair of jaws one for each end of the band, said jaws being provided with gripping hooks to which the band is detachably connected and a pair of sizing collars with which said band is adapted to engage and means for actuating said jaws, thereby flexing said band around said sizing collars so as to form a hollow cylinder.

24. In an apparatus for assembling piston rings, the combination of a band of flexible metal, a pair of jaws one for each end of the band, said jaws being provided with gripping faces to which the band is detachably connected, there being two gripping faces for one jaw and one gripping face arranged between the two, for the other jaw, and a pair of sizing collars with which said band is adapted to engage and means for actuating said jaws, thereby flexing said band around said sizing collars so as to form a hollow cylinder.

25. In an apparatus for assembling piston rings, the combination of a band of flexible metal, a pair of sizing collars with which said band is adapted to engage, means for flexing said band around said sizing collars, to which means the band is detachably connected and one or more brackets for supporting the flexible band in its loosened condition after detachment from the flexing means.

26. In an apparatus for assembling piston rings, the combination of a band of flexible metal, a pair of sizing collars with which said band is adapted to engage, means for flexing said band around said sizing collars, to which means the band is detachably connected and a holder at one side of the flexing means comprising a plurality of brackets for supporting the flexible band in its loosened condition after detachment from the flexing means.

27. An apparatus for assembling piston rings comprising in combination a base, an arbor for carrying the piston rings to be finished, an upright for one end of said arbor, a post for the other end of said arbor, a pair of jaws, a flexibile band actuated by said jaws and detachably connected thereto, a carriage for supporting said jaws mounted alongside of the supports for said arbor, one or more brackets arranged to one side of said arbor and extending in the direction of the arbor for receiving the flexible band, a pair of brackets arranged at the side of the arbor opposite to the carriage and carrying centers in which the arbor may be mounted and a frame carrying a gaging device mounted to cooperate with the rings on the arbor when it is positioned in the said centers.

28. In an apparatus for assembling piston rings, the combination of a frame, an arbor for carrying the piston rings, a pair of jaws, a flexible band actuated by said jaws, and means for gaging the rings comprising a pair of arbor supporting standards, centers carried thereby, and a measuring gage mounted to cooperate with the rings on the arbor when it is positioned in the said centers.

29. In an apparatus for assembling piston rings, the combination of a frame, an arbor for carrying the piston rings, a pair of jaws, a flexible band actuated by said jaws, and means for gaging the rings comprising a pair of arbor supporting standards, centers carried thereby, a swinging frame and a measuring gage mounted on said frame and adapted to gage the rings on the arbor when it is positioned in the said centers.

30. In an apparatus for assembling piston rings, the combination of a frame, an arbor for carrying the piston rings, a pair of jaws, a flexible band actuated by said jaws, and means for gaging the rings comprising a pair of arbor supporting standards, centers carried thereby, a swinging frame including a transverse bar, a measuring gage mounted on said bar and adapted to slide across the frame, so as to gage the rings on the arbor when the arbor is positioned in the centers.

31. In an apparatus for assembling piston rings, the combination of a frame, an arbor for carrying the piston rings, a pair of jaws, a flexible band actuated by said jaws, and means for gaging the rings comprising a pair of arbor supporting standards, centers carried thereby, a swinging frame including a transverse bar, a bracket sliding upon said bar, a measuring gage pivoted to said bracket and adapted to gage the rings on the arbor when the arbor is positioned in the centers.

32. The process of registering split piston rings to bring them with their exterior circumferences in substantially concentric relation, which consists in curving a flexible band about the rings and around a cylindrical sizing member, until the band assumes a cylindrical form.

33. The process of registering packing rings, for finishing, which consists in assembling a plurality of rings to be finished upon an arbor, mounting upon said arbor a pair of sizing collars of predetermined size, and curving a flexible band about said sizing collars and the rings to be finished so as to produce a hollow cylinder of predetermined size, with which the faces of the rings to be finished engage.

34. The process of registering packing rings for finishing which consists in assembling a plurality of rings to be finished upon an arbor, clamping the rings side by side upon the arbor, mounting a pair of sizing collars of predetermined size in concentric relation to said arbor, and forcibly curving a flexible band about said sizing collars and the rings to be finished so as to produce a hollow cylinder of predetermined size, within which the surfaces of the rings to be finished engage.

35. The process of assembling packing rings for finishing which consists in assembling a plurality of rings to be finished upon an arbor, mounting upon said arbor a pair of sizing collars of predetermined size, and curving a flexible band about said sizing collars and the rings to be finished so as to produce a hollow cylinder of predetermined size within which the surfaces of the rings to be finished engage, loosening the clamp for the rings to be finished, vibrating the mechanism and reclamping the rings.

36. The process of assembling packing rings for finishing which consists in assembling a plurality of rings to be finished upon an arbor, mounting upon said arbor a pair of sizing collars of predetermined size, and forcibly curving a flexible band about said sizing collars and the rings to be finished so as to produce a hollow cylinder of predetermined size, within which the surfaces of the rings to be finished engage, clamping them in their positions.

37. The process of assembling packing rings for finishing which consists in assembling a plurality of rings to be finished upon an arbor, mounting upon said arbor a pair of sizing collars of predetermined size, forcibly curving a flexible band about said sizing collars and the rings to be finished so as to produce a hollow cylinder of predetermined size, within which the surfaces of the rings to be finished engage, gaging the rings and finishing the surfaces of the rings.

In testimony whereof, I have signed my name to this specification, in the presence of a subscribing witness.

ROBERT B. WASSON.

Witness:
LOUELLA F. LITTLE.